(12) United States Patent
Noda et al.

(10) Patent No.: US 6,923,209 B2
(45) Date of Patent: Aug. 2, 2005

(54) LIQUID PRESSURE CONTROL SYSTEM

(75) Inventors: Satoshi Noda, Miyagi (JP); Shigeto Ryuen, Miyagi (JP); Hideki Furuta, Miyagi (JP); Hidetoshi Watanabe, Miyagi (JP); Masamichi Kagawa, Miyagi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/436,446

(22) Filed: May 13, 2003

(65) Prior Publication Data

US 2004/0007273 A1 Jan. 15, 2004

(30) Foreign Application Priority Data

May 13, 2002 (JP) ........................................ 2002-137459

(51) Int. Cl.[7] ............................................. F15B 13/044
(52) U.S. Cl. ....................................... 137/596.17; 91/32
(58) Field of Search ........................ 137/596.17, 599.03, 137/601.14; 91/32; 251/32

(56) References Cited

U.S. PATENT DOCUMENTS 3,540,480 A * 11/1970 Leibfritz et al. ....... 137/625.64
4,726,393 A * 2/1988 Herner ................... 137/625.64
5,996,629 A * 12/1999 Sato et al. .............. 137/625.64

FOREIGN PATENT DOCUMENTS

JP          5-324092       12/1993

* cited by examiner

*Primary Examiner*—Gerald A. Michalsky
(74) *Attorney, Agent, or Firm*—Arent Fox, PLLC

(57) ABSTRACT

In a liquid pressure control system including a spool-type control valve mounted between a liquid pressure source and an actuator in such a manner that an output liquid pressure from the liquid pressure source is controlled in accordance with a thrust exhibited by a linear solenoid, a manually operated valve is disposed in a valve housing of the control valve to have an operational axis parallel to an axis of the linear solenoid. The manually operated valve is capable of blocking the communication between the actuator and the control valve and bringing the liquid pressure source into communication with the actuator to bypass the control valve. Thus, the supply of a liquid pressure to the actuator can be secured in any abnormality of the control valve, while enabling a reduction in size of the system in an axial direction of the control valve.

10 Claims, 6 Drawing Sheets

LIQUID PRESSURE CONTROL SYSTEM

BACKGROUND OF THE INVENTION

1. Field of the Invention

The present invention relates to a liquid pressure control system including a spool-type control valve mounted between a liquid pressure source and an actuator so that an output liquid pressure from the liquid pressure source can be controlled in accordance with a thrust exhibited by a linear solenoid.

2. Description of the Related Art

A conventional liquid pressure control system is already known, for example, from Japanese Patent Application Laid-open No. 5-324092 and the like.

The conventional liquid pressure control system is required to avoid a situation where the supply of a liquid pressure to the actuator is disenabled due to the malfunction of the linear solenoid. In the conventional system, another solenoid is disposed in an axial arrangement with the linear solenoid so that, when the linear solenoid is malfunctioned, the supply of the liquid pressure to the actuator is secured by forcibly operating the control valve by another solenoid.

The conventional system has a structure in which the linear solenoid and the another solenoid are disposed in the axial arrangement, and hence the size of the liquid pressure control system is increased in the axial direction of the spool-type control valve. In addition, when a spool of the control valve is locked within a valve housing to block the communication between a liquid pressure source and the actuator by the spool, the supply of the liquid pressure cannot be secured in the conventional system.

SUMMARY OF THE INVENTION

Accordingly, it is an object of the present invention to provide a liquid pressure control system, wherein the supply of the liquid pressure can be secured in any abnormality of the control valve, while enabling a reduction in size of the liquid pressure control system in the axial direction of the spool-type control valve.

To achieve the above object, according to a first aspect of the present invention, there is provided a liquid pressure control system comprising a spool-type control valve mounted between a liquid pressure source and an actuator so that an output liquid pressure from the liquid pressure source can be controlled in accordance with a thrust exhibited by a linear solenoid, wherein a manually operated valve is disposed in a valve housing of the control valve to have an operational axis parallel to an axis of the linear solenoid, the manually operated valve being capable of blocking communication between the actuator and the control valve and bringing the liquid pressure source into communication with the actuator to bypass the control valve in response to the manual operation.

With such arrangement of the first feature, when an abnormality is arisen in the control valve, the manually operated valve is operated to block the communication between the actuator and the control valve and bring the liquid pressure source into communication with the actuator to bypass the control valve, whereby the supply of the liquid pressure to the actuator can be secured in any abnormality of the control valve. Moreover, since the manually operated valve having the operational axis parallel to the axis of the linear solenoid is disposed in the valve housing of the control valve, the number of parts can be minimized, and moreover it is possible to provide a reduction in size of the liquid pressure control system in a direction along the axis of the control valve, while minimizing an increase in size in a direction perpendicular to the axis of the control valve.

According to a second aspect of the present invention, in addition to the arrangement of the first feature, the manually operated valve is disposed in the valve housing so that it can be operated manually on a side opposite from the linear solenoid. With such arrangement, the control valve and the manually operated valve can be disposed in proximity to each other without interference between the linear solenoid and an operating portion of the manually operated valve, thereby providing the reduction in size of the liquid pressure control system in the direction along the axis of the control valve, while minimizing the increase in size in the direction perpendicular to the axis of the control valve.

According to a third aspect of the present invention, in addition to the arrangement of the first feature, the valve housing includes a first slide bore and a second slide bore with their axes parallel to each other, a first input port, a first output port and a releasing port being open into an inner surface of the first slide bore, and a second input port leading to the first input port and the liquid pressure source, a communication port leading to the first output port and a second output port leading to the actuator being open into an inner surface of the second slide bore; a first spool of the control valve is slidably received in the first slide bore in such a manner to switch over alternative connection and disconnection of the first output port to and from the first input port and the releasing port depending on the axial movement thereof; and a second spool of the manually operated valve is slidably received in the second slide bore in such a manner to switch over alternative connection and disconnection of the second output port to and from the communication port and the second input port depending on the axial movement thereof.

With the arrangement of the third feature, the manually operated valve capable of blocking the communication between the actuator and the control valve and bringing the liquid pressure source into communication with the actuator to bypass the control valve can be simply constructed.

According to a fourth aspect of the present invention, in addition to the arrangement of the third feature, a flat mounting surface for mounting the valve housing to a support is formed on one side of the valve housing in parallel to a direction of arrangement of the first and second slide bores, and the first output port and the communication port communicating with a communication recess formed in the mounting surface as well as the first input port, the releasing port, the second input port and the second output port each opening into the mounting surface are provided in the valve housing to have axes perpendicular to the mounting surface.

With such arrangement of the fourth feature, each of the ports can be formed in parallel to one another from the same direction, for example, by boring, leading to an enhancement in boring workability. Moreover, it is possible to simply connect the control valve and the manually operated valve without need for the press-fitting of a plug or the like by virtue of the communication recess, and to easily form the first output port and the communication port by working.

According to a fifth aspect of the present invention, in addition to the arrangement of the third feature, the manually operated valve includes: the second spool, a manually operating element which is supported on the valve housing so that its position in a direction along the axis of the second slide bore can be adjusted, and which abuts against one end of the second spool; and a return spring for biasing the second spool toward the manually operating element.

With such arrangement, a working accuracy for the second spool and the manually operating element separate from each other can be set at a relatively rough level.

According to a sixth aspect of the present invention, in addition to the arrangement of the fifth feature, the manually operating element comprises: a first shaft portion which has, on its outer periphery, external threads meshed for advancing and retracting movements with internal threads provided on the inner surface of the second slide bore, and which has an inner end abutting against one end of the second spool; a second shaft portion which is formed to have a diameter larger than that of the first shaft portion and which is coaxially and integrally connected to an outer end of the first shaft portion in such a manner that an annular seal member is mounted on an outer periphery of the second shaft portion to come into sliding contact with the inner surface of the second slide bore outside the internal threads; and a head portion integrally connected to an outer end of the second shaft portion to enable the manually turning operation. With such arrangement, the entrance of water and dust into the second slide bore can be prevented to smoothly move the second spool, while driving the second spool axially by turning the manually operating element. Moreover, rust of the external threads and the internal threads can be prevented to achieve a good turning of the manually operating element.

According to a seventh aspect of the present invention, in addition to the arrangement of the sixth feature, an operating groove is provided in an outer end of the head portion formed to have a circular outer surface having a diameter enabling the insertion of the head portion into the outer end of the second slide bore, the opening groove extending along one diametrical line of the head portion. With such arrangement, the manually operating element can be turned simply by a minus screwdriver, a coin or the like, while forming the head portion into a simple and compact shape.

According to an eighth aspect of the present invention, in addition to the arrangement of the sixth or seventh feature, an annular engagement groove is provided in an outer periphery of the head portion, and a flat plate-shaped stopper is mounted to the valve housing and adapted to engage into the engagement groove in a state in which the second spool is in a position to cause the communication port to communicate with the second output port. With such arrangement, it is possible to prevent the manually operating element from being erroneously operated in a state in which there is no abnormality in the control valve. Moreover, since the stopper is of the flat plate-shape, the stopper cannot protrude largely from the valve housing in an axial direction of the axis of the second slide bore, and it is possible to avoid an increase in size of the liquid pressure control system due to the provision of the stopper.

According to a ninth aspect of the present invention, in addition to the eighth feature, the stopper is fastened to the valve housing by a single screw member threadedly meshed with the valve housing so that, in a state in which the screw member is loosened, the stopper can be turned about an axis of the screw member between an engaging position in which the stopper is in engagement in the engagement groove and an disengaging position in which the stopper is out of engagement in the engagement groove; and the stopper is provided with a turning movement-restricting portion adapted to abut against the valve housing in response to the turning movement of the stopper from the disengaging position to the engaging position in the same direction as a turning direction to tighten the screw member. With such arrangement, the engagement of the stopper with the manually operating element can be released easily by loosening the screw member. In addition, when the screw member is tightened in a state in which the stopper is in engagement in the engagement groove, the turning movement-restricting portion abuts against the valve housing, so that the screw member can be tightened in such a manner that the stopper is not turned along with the screw member in response to the rotation of the screw member, whereby the operation of fixing the stopper to the valve housing is facilitated.

According to a tenth aspect of the present invention, in addition to the eighth feature, the second spool is slidably received in the second slide bore for axial movement between a retracted position in which the communication port is in communication with the second output port and an advanced position in which the second input port is in communication with the second output port; and the manually operating element is provided with an advancement-restricting portion adapted to abut against the valve housing to inhibit the advancement of the manually operating element in response to the movement of the second spool from the retracted position to the advanced position. With such arrangement, it is possible to recognize an operational amount of a manually operating element until the second spool is advanced to the advanced position in which the second input port is in communication with the second output port.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
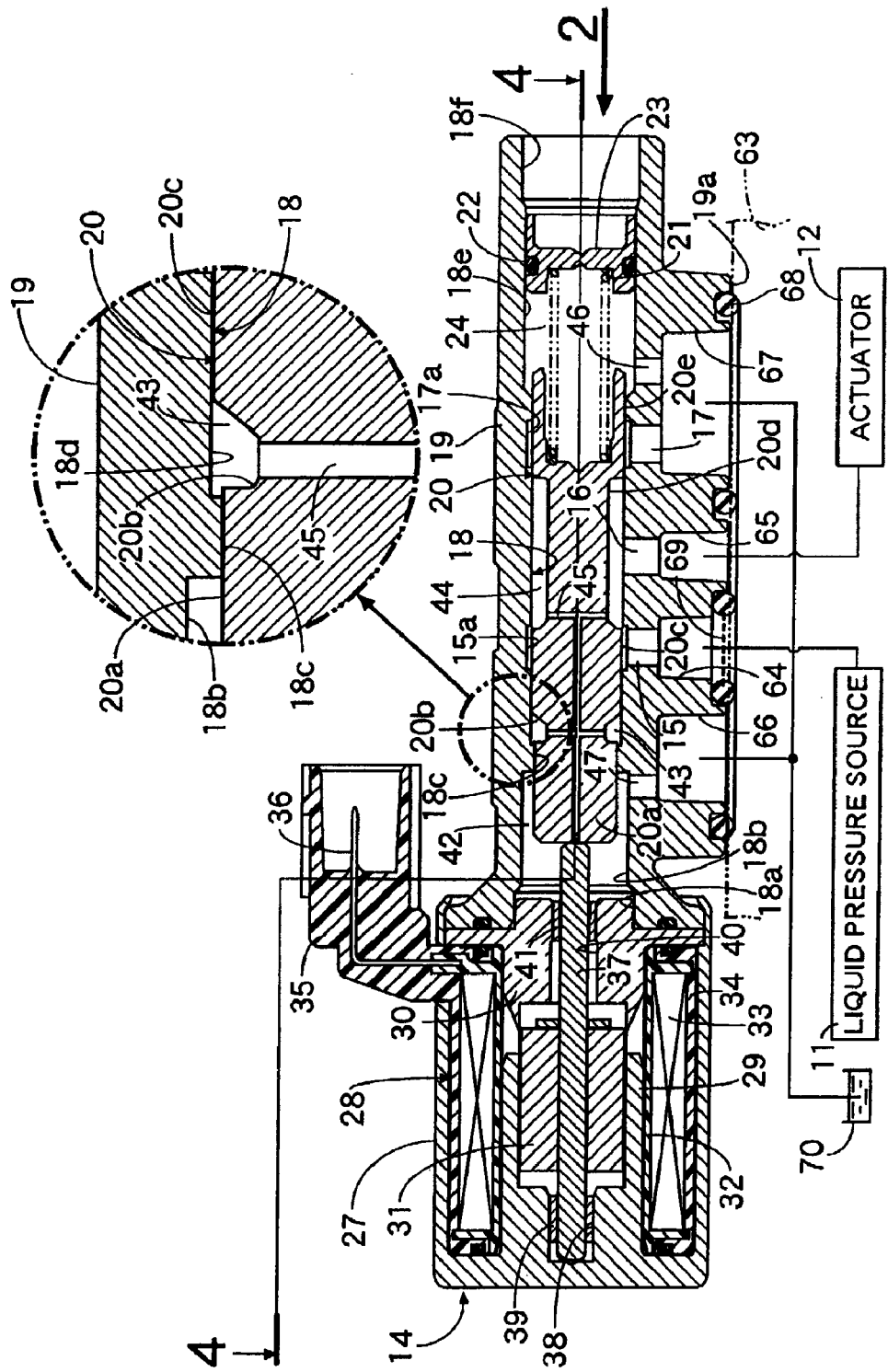
FIG. 1 is a vertical sectional view of a liquid pressure control system, taken along a line 1—1 in FIG. 2.
Figure 2:
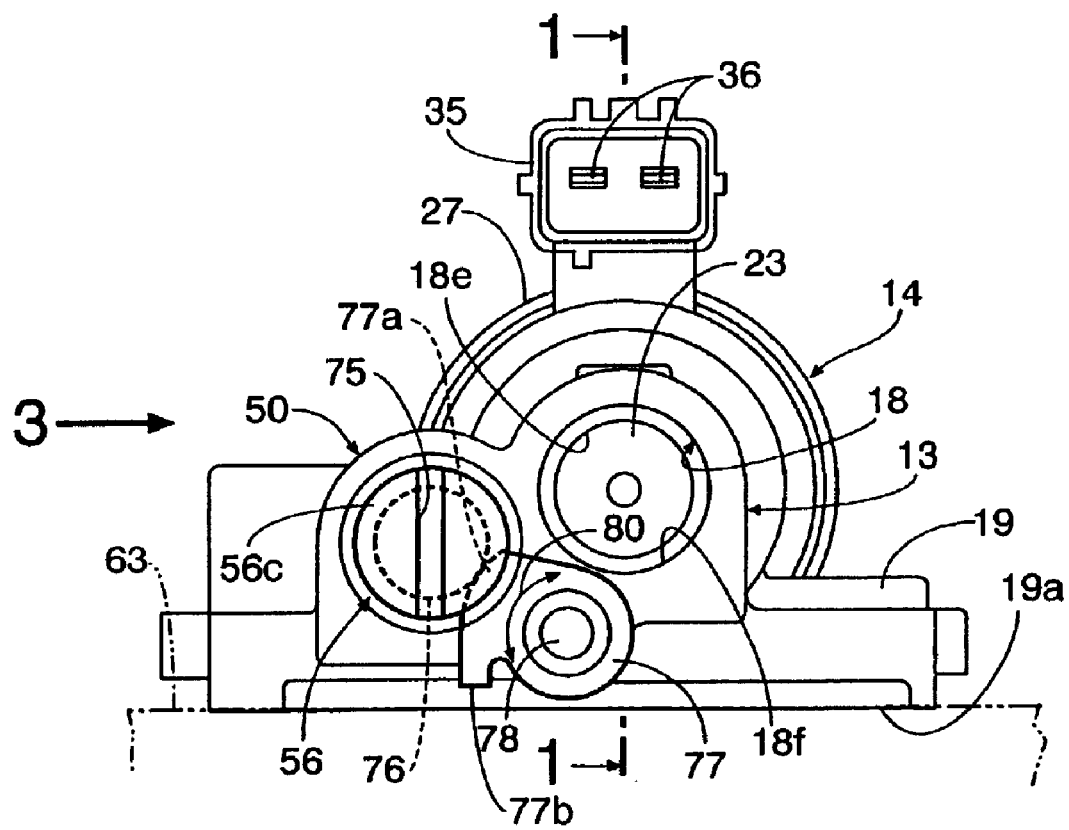
FIG. 2 is a view taken in a direction of an arrow 2 in FIG. 1.
Figure 3:
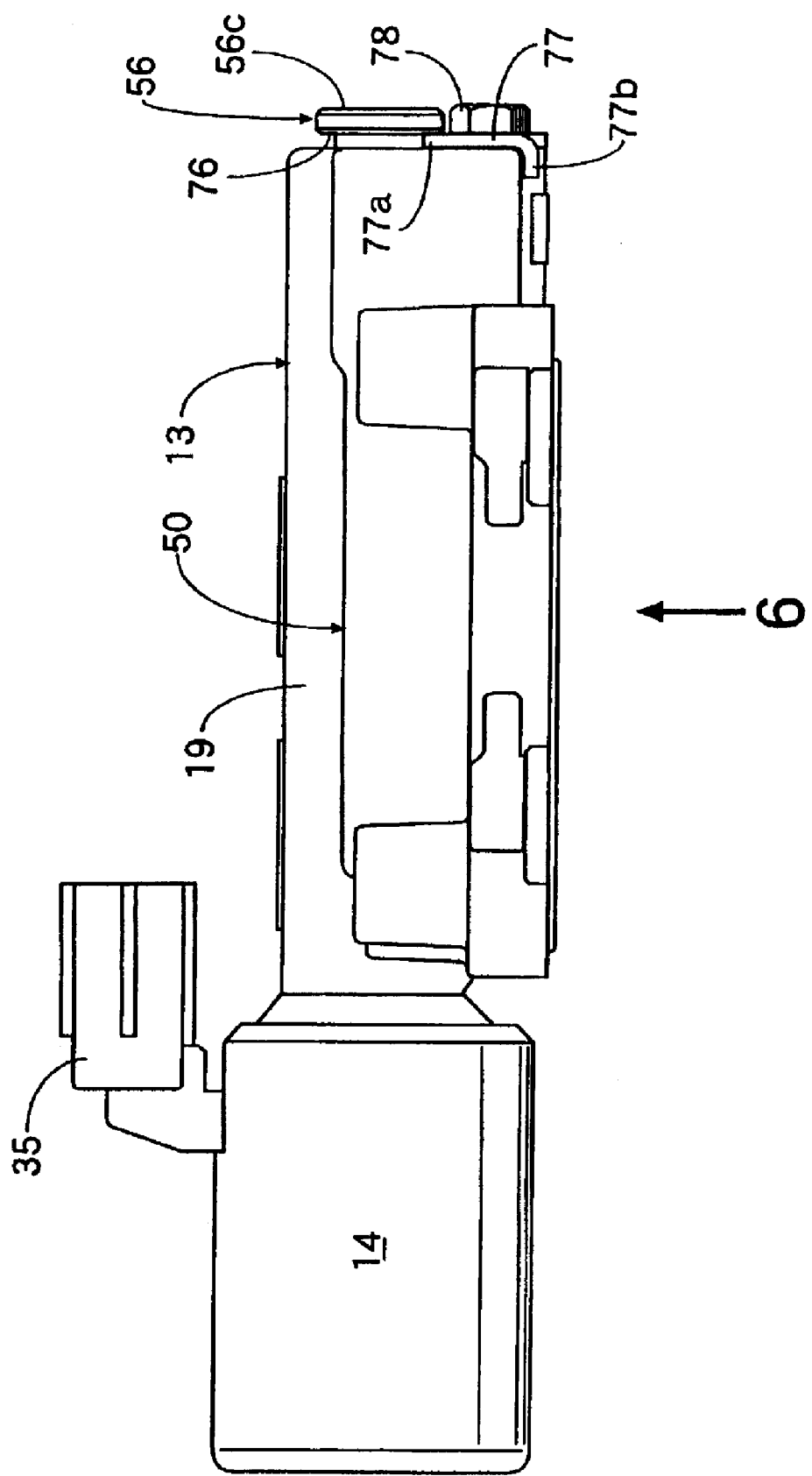
FIG. 3 is a view taken in a direction of an arrow 3 in FIG. 2.

Referring first to FIGS. 1 to 3, a liquid pressure control system includes a spool-type control valve 13 mounted between a liquid pressure source 11 and an actuator 12 so that a liquid pressure output from the liquid pressure source 11 is controlled in accordance with a thrust exhibited by a linear solenoid 14.

The control valve. 13 includes a valve housing 19 provided with a first slide bore 18, into an inner surface of which a first input port 15, a first output port 16 and a first releasing port 17 open, a first spool 20 slidably received in the first slide bore 18 in such a manner to switch over the alternative connection and disconnection of the first output port 16 to and from the first input port 15 and the first releasing port 17, a linear solenoid 14 mounted to the valve housing 19 to provide a thrust to axially one end of the first spool 20, and a first return spring 21 for exhibiting a spring force for biasing the first spool 20 toward the linear solenoid 14.

The first slide bore 18 is provided in the valve housing 19 to open at its axially opposite ends, and comprises a first bore portion 18a, a second bore portion 18b having a diameter smaller than that of the first bore portion 18a, a third bore portion 18c having a diameter smaller than that of the second bore portion 18b, a fourth bore portion 18d having a diameter larger than that of the third bore portion 18c, a fifth bore portion 18e having a diameter larger than that of the fourth bore portion 18d and a sixth bore portion 18f having a diameter larger than that of the fifth bore portion 18e, which are coaxially connected to one another in the named order from the side of the linear solenoid 14.

A plug 23 having, around its outer periphery, an O-ring 22 adapted to resiliently contact with an inner surface of the fifth bore portion 18e, is press-fitted into the fifth bore portion 18e to define a first spring chamber 24 between the plug 23 and the first spool 20. A first return spring 21 accommodated in the first spring chamber 24 is mounted under compression between the plug 23 and the first spool 20. The set load of the first return spring 21 is adjusted depending on the depth of press-fitting of the plug 23.

The linear solenoid 14 includes a solenoid housing 27 formed into a bottomed cylindrical shape from a magnetic material, a cylindrical coil assembly 28 accommodated in the solenoid housing 27, a cylindrical yoke 29 disposed within the coil assembly 28 and connected integrally to a central portion of a closed end of the solenoid housing 27, a stationary core 30 which is coupled by crimping to an open end of the solenoid housing 27 in such a manner that the soil assembly 28 is sandwiched between the core 30 and the closed end of the solenoid housing 27 and which is opposed with a predetermined distance to the yoke 29, and a movable core 31 slidably fitted in the yoke 29 and the stationary core 30.

The coil assembly 28 comprises a bobbin 32 made of a synthetic resin, a coil 33 wound around the bobbin 32, and a coil case 34 made of a synthetic resin and covering the bobbin 32 and the coil 33. A coupler 35 protruding outwards from the solenoid housing 27 is integrally connected to the coil case 34, and connecting terminals 36, 36 leading to the coil 33 are disposed within the coupler 35.

An output rod 37 is secured to the movable core 31 to extend through a central portion of the movable core 31. One end of the output rod 37 is slidably carried at its one end in a bag-shaped first bearing bore 38 provided in the closed end of the solenoid housing 27 with a first bush 39 interposed therebetween. The other end of the output rod 37 is slidably carried in a second bearing bore 40 extending through a central portion of the stationary core 30 with a second bush 41 interposed therebetween.

The linear solenoid 14 is mounted to the valve housing 19 in such a manner than a portion of the stationary core 30 is inserted into the first bore portion 18a of the first slide bore 18 to liquid-tightly close one end of the first slide bore 18. A first operating chamber 42 is defined between the stationary core 30 and the first spool 20 within the first slide bore 18, and the other end of the output rod 37 coaxially abuts against one end of the first spool 20 within the first operating chamber 42.

A first land portion 20a, a first annular groove 20b, a second land portion 20c, a second annular groove 20d and a third land portion 20e are provided in the first spool 20 in the named order from the side of the linear solenoid 14. The second and third land portions 20c and 20e are formed to have the same diameter, and the first land portion 20a is formed to have a diameter smaller than that of the second and third land portions 20c and 20e.

The first spool 20 is slidably received in the first slide bore 18 in such a manner that the first land portion 20a is always in sliding contact with an inner surface of the third bore portion 18c, and the second and third land portions 20c and 20e are always in sliding contact with an inner surface of the fourth bore portion 18d. An annular liquid pressure chamber 43 is defined between an outer surface of the first spool 20 and an inner surface of the first slide bore 18 in such a manner that it is sandwiched between the first and second land portions 20a and 20c. An annular output liquid pressure chamber 44 is defined between the outer surface of the first spool 20 and the inner surface of the first slide bore 18 in such a manner that it is sandwiched between the second and third land portions 20c and 20e. The liquid pressure chamber 43 communicates with the output liquid pressure chamber 44 through a communication passage 45 provided in the first spool 20.

The first input port 15 opens into the inner surface of the fourth bore portion 18d of the first slide bore 18 through a first annular recess 15a. The first annular recess 15a is provided in the inner surface of the fourth bore portion 18d at a location where it leads to the output liquid pressure chamber 44 when the first spool 20 is in a retracted position as shown in FIG. 1, but it is closed by the second land portion 20c when the first spool 20 has advanced to an advanced position (a right position in FIG. 1). The first releasing port 17 also opens into the inner surface of the fourth bore portion 18d of the first slide bore 18 through a second annular recess 17a. The second annular recess 17a is provided in the inner surface of the fourth bore portion 18d at a location where it is closed by the third land portion 20e when the spool 20 is in the retracted position as shown in FIG. 1, but it leads to the output liquid pressure chamber 44 when the first spool 20 is advanced to the advanced position (the right position in FIG. 1). Further, the first output port 16 is provided in the valve housing 19 to open into the inner surface of the fourth bore portion 18d of the first slide bore 18 at a location where it always leads to the output liquid pressure chamber 44.

The valve housing 19 is also provided with a second releasing port 46 leading to the first spring chamber 24, and a third releasing port 47 leading to the first operating chamber 42.

With the control valve 13, the first spool 20 is pushed toward the advanced position by the thrust of the linear solenoid 14 which changes depending on the amount of supplied current to bring the first output port 16 into communication with the first releasing port 17, and the first spool 20 is pushed toward the retracted position by the spring force of the first return spring 21 to bring the first output port 16 into communication with the first input port 15. A pressure-receiving area of the second land portion 20c facing from the front the liquid pressure chamber 43 communicating with the output liquid pressure chamber 44 through the communication passage 45 is larger than a pressure-receiving area of the first land portion 20a facing from the rear the liquid pressure chamber 43 and hence, the first spool 20 is pushed toward the advanced position by the liquid pressure based on the liquid pressure in the liquid pressure chamber 43, i.e., in the first output port 16. Therefore, the first spool 20 is moved axially so that a total liquid pressure based on the thrust of the linear solenoid 14 and the liquid pressure in the first output port 16 and the spring force of the first return spring 21 are balanced with each other, whereby the liquid pressure in the first input port 15 is controlled and output from the first output port 16.

To ensure the supply of the liquid pressure to the actuator 12 when the control valve 13 is broken down, for example, due to the malfunction of the linear solenoid 14 or the locking of the first spool 20 within the first slide bore 18, a manually operated valve 50 which is adapted, in accordance with a manual operation, to bring the actuator 12 and the control valve 13 out of communication with each other and bring the liquid pressure source 11 into communication with the actuator 12 to bypass the control valve 13 is disposed in parallel to the control valve 13, and which shares the valve housing 19 with the control valve 13.

Figure 4:
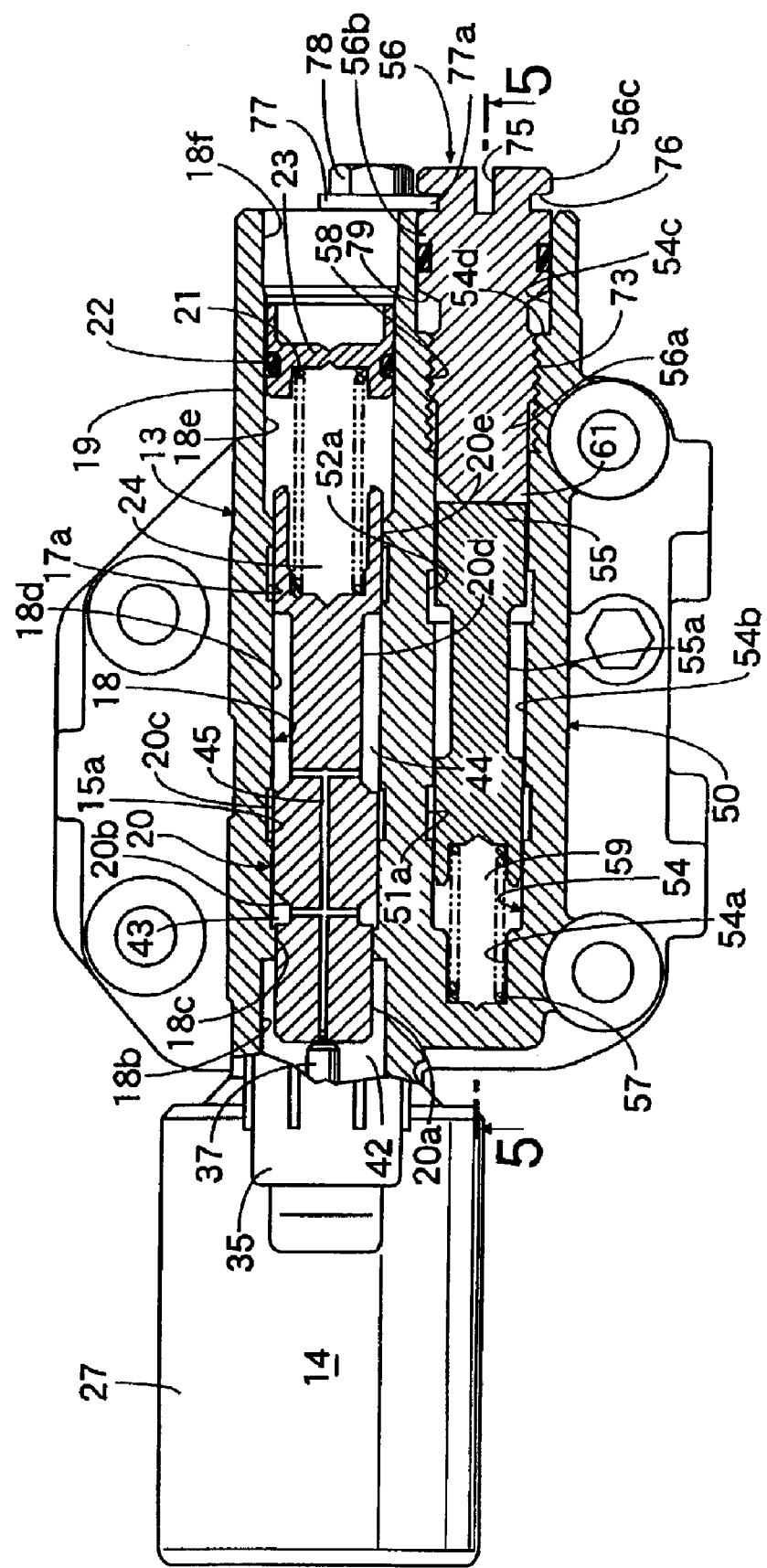
FIG. 4 is a sectional view taken along a line 4—4 in FIG. 1.
Figure 5:
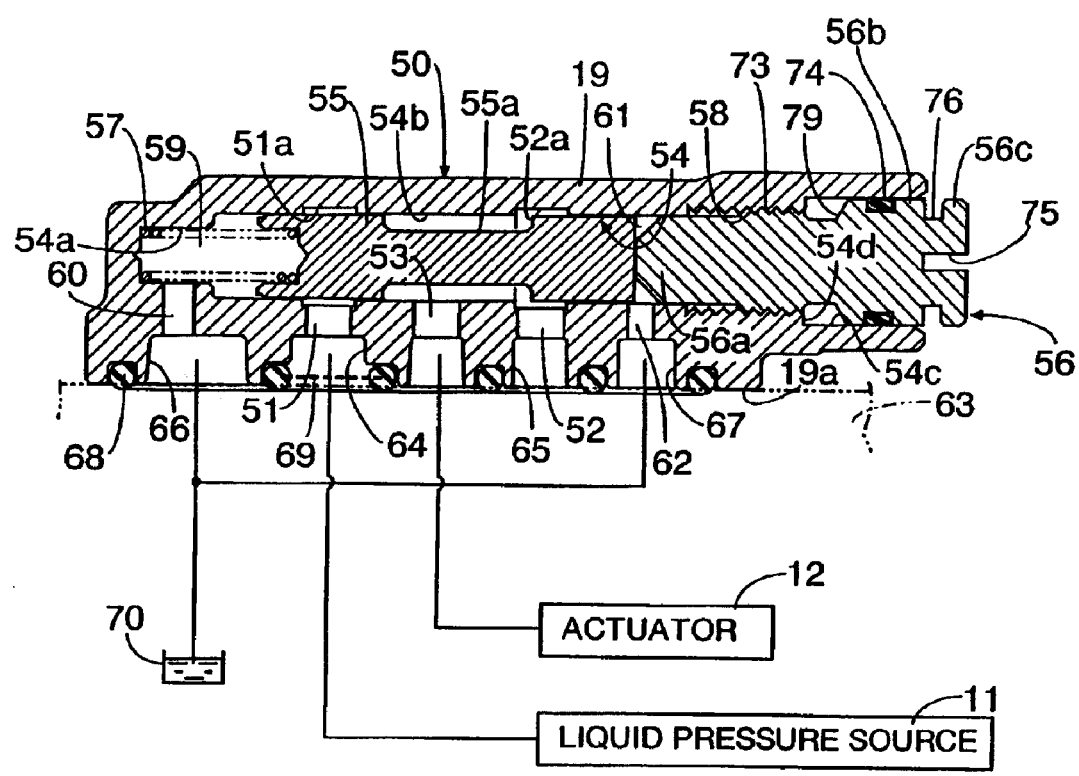
FIG. 5 is a sectional view taken along a line 5—5 in FIG. 4.

Referring also to FIGS. 4 and 5, the manually operated valve 50 is disposed in the valve housing 19 with its an operational axis parallel to the axis of the linear solenoid 14 so that it can be operated manually on a side opposite from the linear solenoid 14.

A second slide bore 54 is provided in the valve housing 19 to have an axis parallel to the first slide bore 18 so that a second input port 51 leading to the first input port 15 and the liquid pressure source 11, a communication port 52 leading to the first output port 16 and a second output port 53 leading to the actuator 12 open into an inner surface of the second slide bore 54. The manually operated valve 50 includes a second spool 55 slidably received in the second slide bore 54, a manually operating element 56 which is supported on the valve housing 19 so that its position in a direction along the axis of the second slide bore 54 can be adjusted, and which abuts against one end of the second spool 55, and a second return spring 57 for biasing the second spool 55 toward the manually operating element 56.

The second slide bore 54 is a bag-shaped bore comprising a smaller-diameter bore portion 54a with one end closer to the linear solenoid 14 being closed, a medium-diameter bore portion 54b coaxially connected to the other end of the smaller-diameter bore portion 54a and having a diameter larger than that of the smaller-diameter bore portion 54a, and a larger-diameter bore portion 54c coaxially connected to the other end of the medium-diameter bore portion 54b and having a diameter larger than the medium-diameter bore portion 54b so that these bore portions are coaxially connected to one another. Internal threads 58 are provided on a wall closer to the other end of the medium-diameter bore portion 54b.

The second spool 55 is slidably received in the medium-diameter bore portion 54b and has an annular recess 55a at its axially intermediate portion. The second return spring 57 is accommodated in a second spring chamber 59 defined between the closed end of the second slide bore 54 and the second spool 55, and is mounted under compression between the closed end of the smaller-diameter bore portion 54a and the second spool 55.

The second input port 51 opens into an inner surface of the medium-diameter bore portion 54b of the second slide bore 54 through a third annular recess 51a. The third annular recess 51a is provided in the inner surface of the medium-diameter bore portion 54b in such a manner that it is blocked from the annular recess 55a when the second spool 55 is in a retracted position as shown in FIGS. 4 and 5, but it communicates with the annular recess 55a when the second spool 55 is advanced to an advanced position (a left position in FIGS. 4 and 5). The communication port 52 opens into the inner surface of the medium-diameter bore portion 54b through a fourth annular recess 52a. The fourth annular recess 52a is provided in the inner surface of the medium-diameter bore portion 54b in such a manner that it is in communication with the annular recess 55a when the second spool 55 is in the retracted position, but it is blocked from the annular recess 55a when the second spool 55 is advanced to the advanced position. Further, the second output port 53 is provided in the valve housing 19 in such a manner that it opens into the inner surface of the medium-diameter bore portion 54b at a location where it is always in communication with the annular recess 55a irrespective of the axial position of the second spool 55.

Namely, the second spool 55 is slidably received in the second slide bore 54 in such a manner to switch over the alternative connection and disconnection of the second output port 53 to and from the communication port 52 and the second input port 51 depending on the axial movement thereof.

The valve housing 19 is also provided with a fourth releasing port 60 leading to the second spring chamber 59, and a fifth releasing port 62 leading to a second operating chamber 61 defined in the second slide bore 54 between the second spool 55 and the manually operated valve 56.

Figure 6:
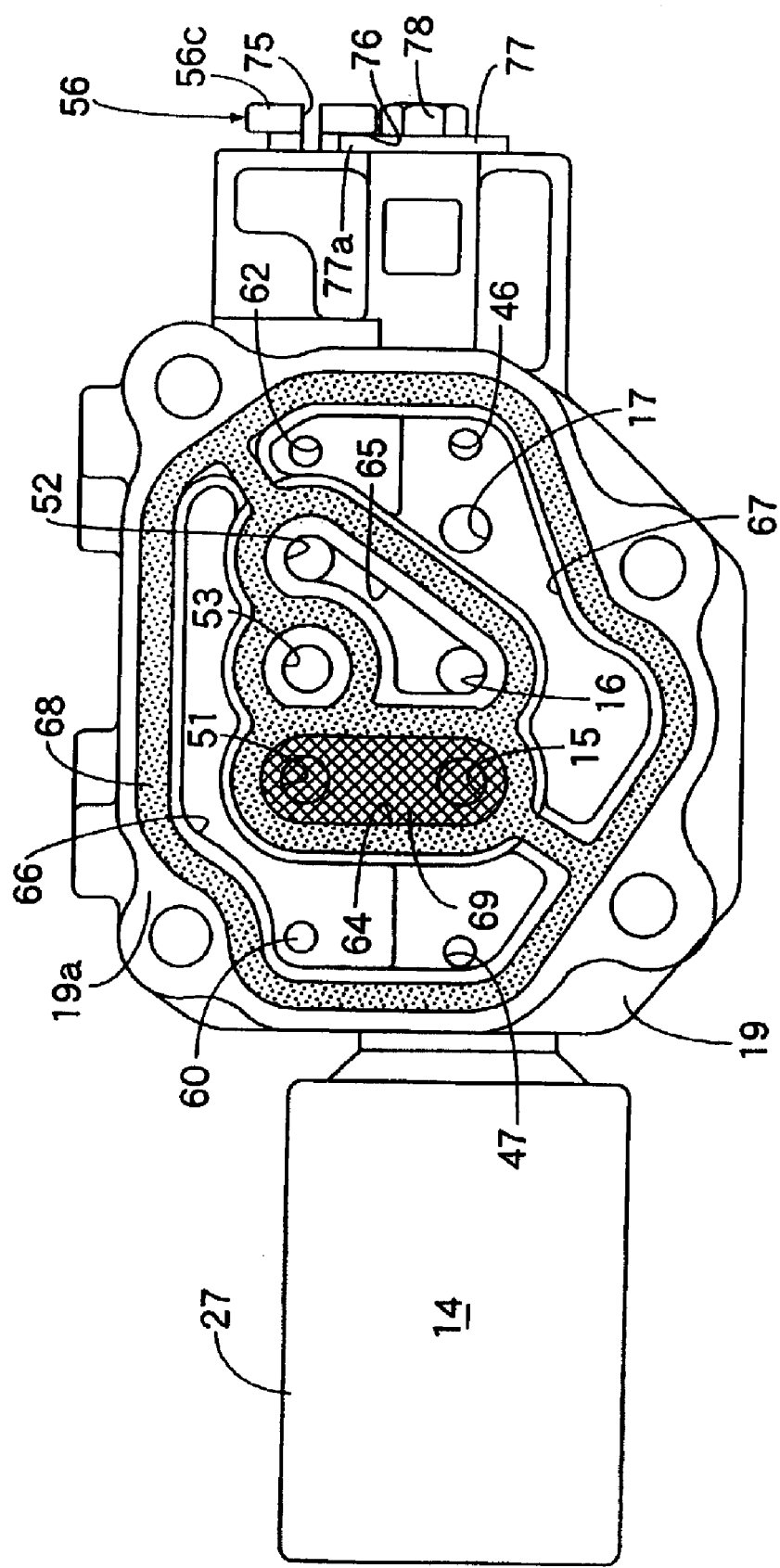
FIG. 6 is a view taken in a direction of an arrow 6 in FIG. 3.

Referring also to FIG. 6, a flat mounting surface 19a for mounting the valve housing 19 to a support 63 is formed on one side of the valve housing 19 in parallel to a direction of arrangement of the first and second slide bores 18 and 54. The following ports are provided in the valve housing 19 to have axes perpendicular to the mounting surface 19a: the first input ports 15 and 51 communicating with a first communication recess 64 provided in the mounting surface 19a; the first output port 16 and the communication port 52 communicating with a second communication recess 65 provided in the mounting surface 19a; the third and fourth releasing ports 47 and 60 communicating with a third communication recess 66 provided in the mounting surface 19a; the first, second and fifth releasing ports 17, 46 and 62 communicating with a fourth communication recess 67 provided in the mounting surface 19a; and the second output port 53 which opens into the mounting surface 19a.

A gasket 68 is mounted to the mounting surface 19a to resiliently come into contact with the support 63 to seal open ends of the first to fourth communication recesses 64 to 67 and the second output port 53 from one another. A filter 69 is supported on the gasket 68 to cover the entire first communication recess 64.

Thus, when the valve housing 19 is mounted to the support 63, the first communication recess 64 is put into communication with the liquid pressure source 11; the second communication recess 65 is closed by the support 63; the third and fourth communication recesses 66 and 67 are put into communication with a reservoir 70; and the second output port 53 is put into communication with the actuator 12.

The manually operating element 56 comprises a first shaft portion 56a which has, on its outer periphery, external threads 73 meshed for advancing and retracting movements with the internal threads 58 provided on the inner surface of the wall at the other end of the medium-diameter bore portion 54b of the second slide bore 54, and which has an inner end abutting against one end of the second spool 55, a second shaft portion 56b which is formed to have a diameter larger than that of the first shaft portion 56a and which is coaxially integrally connected to an outer end of the first shaft portion 56a in such a manner that an annular seal member 74 is mounted on an outer periphery of the second shaft portion 56b to come into sliding contact with the inner surface of the larger-diameter bore portion 54c of the second slide bore 54 outside the internal threads 58, and a head portion 56c integrally connected to an outer end of the second shaft portion 56b to enable the manually turning operation.

Moreover, the head portion 56c is formed into a short columnar shape having a circular outer surface having an outer diameter enabling the insertion of head portion 56c into the larger-diameter bore portion 54c which is an outer end of the second slide bore 54. An operating groove 75 is provided in an outer end of the head portion 56c to extend along one diametrical line of the head portion 56c. An annular engagement groove 76 is also provided in an outer periphery of the head portion 56c. A flat plate-shaped stopper 77 is mounted to the valve housing 19 and adapted to engage in the engagement groove 76 in a state in which the second spool 55 is in the retracted position to permit the communication of the communication port 52 with the second output port 53.

The stopper 77 has an engagement portion 77a adapted to engage in the engagement groove 76 and is fastened to the valve housing 19 by a single screw member 78 threadedly meshed with the valve housing 19, but in a state in which the screw member 78 has been loosened, the stopper 77 can be turned about an axis of the screw member 78 between an engaging position in which the engagement portion 77a is in engagement in the engagement groove 76 and an disengaging position in which the engagement portion 77a is out of engagement in the engagement groove 76.

Moreover, a direction of turning movement of the stopper 77 from the engaging position to the disengaging position is set in the same direction as a direction 80 (a clockwise direction in FIG. 2) of tightening the screw member 78. The stopper 77 is provided with a turning movement-restricting portion 77b which is put into abutment against a side of the housing 19 (a side adjacent the support 63 in the present embodiment) in response to the turning of the stopper 77 from the disengaging position to the engaging position.

A tapered advancement-restricting portion 79 is provided at a front end of the head portion 56c of the manually operating element 56, so that the advancement of the manually operating element 56 is inhibited by putting the advancement-restricting portion 79 into abutment against an inner peripheral edge of a step 54d formed between the medium-diameter bore portion 54b and the larger-diameter bore portion 54c in the second slide bore 54 in the valve housing 19 in response to the movement of the second spool 55 from the retracted position to the advanced position.

The operation of this embodiment will be described below. The manually operated valve 50 capable of blocking the communication between the actuator 12 and the control valve 13 and bringing the liquid pressure source 11 into communication with the actuator 12 to bypass the control valve 13 in response to the manual operation, is disposed in the valve housing 19 of the control valve 13. Therefore, even if there is any abnormality including the malfunction of the linear solenoid 12 and the locking of the first spool 20 in the control valve 13, the supply of the liquid pressure to the actuator 12 can be secured by operating the manually operated valve 50 to block the communication between the actuator 12 and the control valve 12 and to bring the liquid pressure source 11 into communication with the actuator 12 to bypass the control valve 13.

Moreover, since the manually operated valve 50 having the operational axis parallel to the axis of the linear solenoid 14 is disposed in the valve housing 19 of the control valve 13, the size of the liquid pressure control system in the direction along the axis of the control valve 13 can be decreased by disposing the control valve 13 and the manually operated valve 50 in proximity to each other, while minimizing the number of parts as well as an increase in size in the direction perpendicular to the axis of the control valve 13.

The manually operated valve 50 is disposed in the valve housing 19 so that it can be operated manually on the side opposite from the linear solenoid 14. With this arrangement, the control valve 13 and the manually operated valve 50 can be disposed in the proximity to each other without interference between the manually operating element 56 of the manually operated valve 50 and the linear solenoid 14. Therefore, it is possible to provide a reduction in size of the liquid pressure control system in the direction along the axis of the control valve 13, while minimizing the increase in size in the direction perpendicular to the axis of the control valve 13.

The first slide bore 18 on the side of the control valve 13 and the second slide bore 54 on the side of the manually operated valve 50 are provided in the valve housing 19 with their axes parallel to each other. The first spool 20 of the control valve 13 is slidably received in the first slide bore 18 in such a manner to switch over the alternative connection and disconnection of the first output port 16 to and from the first input port 15 and the first releasing port 17 depending on the axial movement thereof. The second spool 55 of the manually operated valve 50 is slidably received in the second slide bore 54 in such a manner to switch over the alternative connection and disconnection of the second output port 53 to and from the communication port 52 leading to the first output port 16 as well as the second input port 51 leading to the first input port 15 and the liquid pressure source 11 depending on the axial movement thereof. The second output port 53 leads to the actuator 12. Therefore, the manually operated valve 50 capable of blocking the communication between the actuator 12 and the control valve 13 and bringing the liquid pressure source 11 into communication with the actuator 12 to bypass the control valve 13, can be simply constructed.

In addition, the flat mounting surface 19a for mounting the valve housing 19 to the support 63 is formed on one side of the valve housing 19 in parallel to the direction of arrangement of the first and second slide bores 18 and 54. The first input port 15, the first output port 16 and the first to third releasing ports 17, 46 and 47 opening into the inner surface of the first slide bore 18 and the second input port 51, the communication port 52, the second output port 53 and the fourth and fifth releasing ports 60 and 62 opening into the inner surface of the second slide bore 54, are provided in the valve housing 19 to have the axes perpendicular to the mounting surface 19a. Therefore, the ports 15 to 17, 46, 47, 51 to 53, 60 and 62 can be formed in parallel to one another from the same direction, for example, by boring, leading to an enhancement in boring workability.

Further, the first to fourth communication recesses 64 to 67 are provided in the mounting surface 19a; the first and second input ports 15 and 51 are in communication with the first communication recess 64; the first output port 16 and the communication port 52 are in communication with the second communication recess 65; the third and fourth releasing ports 47 and 60 are in communication with the third communication recess 66; the first, second and fifth releasing ports are in communication with the fourth communication recess 67; and the second output port 53 opens into the mounting surface 19a. Therefore, it is possible to easily connect a passage (not shown) in the support 63 to the ports 15 to 17, 46, 47, 51 to 53, 60 and 62. Especially, it is possible to simply connect the control valve 13 and the manually operated valve 50 without need for the press-fitting of a plug or the like by virtue of the second communication recess 65, and to easily form the first output port 16 and the communication port 52 by working.

The manually operated valve 50 includes the second spool 55, the manually operating element 56 which is supported on the valve housing 19 so that its position in the direction along the axis of the second slide bore 54 can be adjusted, and which abuts against one end of the second spool 55, and the second return spring 57 for biasing the second spool 55 toward the manually operating element 56, so that the working accuracy for the second spool 55 and the manually operating element 56 separate from each other can be set at a relatively rough level. Namely, if the second spool 55 and the manually operating element 56 are formed integrally with each other, the coaxial accuracy of the second spool 55 and the manually operating element 56 must be set at a high level; but, in the present invention, the coaxial accuracy can be set at a low level and the working accuracy can be set at the relatively rough level by forming the second spool 55 and the manually operating element 56 separately from each other.

The manually operating element 56 comprises the first shaft portion 56a which has, on its outer periphery, the external threads 73 meshed for advancing and retracing movements with the internal threads 58 provided on the inner surface of the second slide bore 54 and which has the inner end abutting against one end of the second spool 55, the second shaft portion 56b which is formed to have the diameter larger than that of the first shaft portion 56a and which is coaxially integrally connected to the outer end of the first shaft portion 56a in such a manner that the annular seal member 74 is mounted on the outer periphery of the second shaft portion 56b to come into sliding contact with the inner surface of the second slide bore 54 at the location outer than the internal threads 58, and the head portion 56c integrally connected to the outer end of the second shaft portion 56b to enable the manually turning operation.

The manually operating element 56 ensures that the entrance of water and dust into the second slide bore 54 can be prevented to move the second spool 55 smoothly, while driving the second spool 55 axially by the turning of the manually operating element 56. Moreover, the rust of the external threads 73 and the internal threads 58 can be prevented to achieve the good turning of the manually operating element 56.

The head 56c is formed to have the circular outer surface having the diameter enabling the insertion of the head portion 56c into the larger-diameter bore portion 54c which is the outer end of the second slide bore 54. The operating groove 75 is provided in the outer end of the head portion 56c to extend along one diametrical line of the head portion 56c. Therefore, the manually operating element 56 can be turned simply by a minus screwdriver, a coin or the like, while forming the head portion 56c into a simple and compact shape.

The annular engagement groove 76 is provided in the outer periphery of the head portion 56c. The flat plate-shaped stopper 77 is mounted to the valve housing 19 and adapted to engage in the engagement groove 76 in a state in which the second spool 55 is in the retracted position to permit the communication of the communication port 52 with the second output port 53. In this way, the erroneous operation of the manually operated valve 50 can be prevented in a state in which there is no abnormality in the control valve 13, by placing the stopper 77 to inhibit the advancement of the manually operating element 56. Moreover, because the stopper 77 is of the flat plate-shape, the stopper 77 cannot protrude largely from the valve housing 19 into the axial direction of the second slide bore 54, and it is possible to avoid an increase in size of the liquid pressure control system due to the provision of the stopper 77.

The stopper 77 is fastened to the valve housing 19 by the single screw member 78, so that in the state in which the screw member 78 threadedly meshed with the valve housing 19 has been loosened, the stopper 77 can be turned about the axis of the screw member 78 between the engaging position in which the stopper 77 is in engagement in the engagement groove 76 and the disengaging position in which the stopper 77 is out of engagement in the engagement groove 76. Thus, it is possible to easily release the engagement of the stopper 77 with the manually operating element 56 by loosening the screw member 78.

In addition, the stopper 77 is provided with the turning movement-restricting portion 77b adapted to abut against the valve housing 19 in response to the turning movement of the stopper 77 from the disengaging position to the engaging position in the same direction as the turning direction 80 of tightening the screw member 78 to the engaging position. Also, the stopper 77 is provided with the turning movement-restricting portion 77b adapted to abut against the valve housing 19 in response to the turning movement of the stopper 77 from the disengaging position to the engaging position.

Therefore, when the screw member 78 is tightened in the state in which the engagement portion 77a of the stopper 77 is in engagement in the engagement groove 76, the turning movement-restricting portion 77b is brought into abutment against the valve housing 19 and hence, the screw member 78 can be tightened in such a manner that the stopper 77 is prevented from being turned along with the screw member 78 in response to the rotation of the screw member 48, whereby the operation of fixing the stopper 77 to the valve housing 19 is facilitated.

Further, the second spool 55 is slidably received in the second slide bore 54 for axial movement between the retracted position in which the communication port 52 is in communication with the second output port 53 and the advanced position in which the second input port 51 is in communication with the second output port 53. The manually operating element 56 is provided with the advancement-restricting portion 79 adapted to abut against the step 54d of the valve housing 19 in response to the movement of the second spool 55 from the retracted position to the advanced position. Therefore, it is possible to easily recognize an operational amount of the manually operating element 56 until the second spool 55 is advanced to the advanced position in which the second input port 51 is in communication with the second output port 53.

Although the embodiment of the present invention have been described in detail, it will be understood that the present invention is not limited to the above-described embodiments, and various modifications in design may be made without departing from the spirit and scope of the invention defined in the claims.

For example, in the control valve 13 in the above-described embodiment, the liquid pressure based on the output liquid pressure is applied to the first spool 20 from the same direction as the thrust of the linear solenoid 14, but the present invention is also applicable to a liquid pressure control system including a control valve constructed so that the liquid pressure based on the output liquid pressure is applied to a spool from a direction opposite from the thrust of the linear solenoid.

What is claimed is:

1. A liquid pressure control system comprising a spool control valve mounted between a liquid pressure source and an actuator so that an output liquid pressure from the liquid pressure source can be controlled in accordance with a thrust exhibited by a linear solenoid, wherein the control valve has a first spool housed in a valve housing and the linear solenoid is mounted to the valve housing such that the linear solenoid and the first spool are provided coaxially with each other and the thrust of the linear solenoid is applicable to one axial end of the first spool, wherein a manually operated valve is disposed in said valve housing of the control valve to have an operational axis parallel to an axis of the linear solenoid and an axis of the first spool, the manually operated valve being capable of blocking communication between the actuator and the control valve and bringing the liquid pressure source into communication with the actuator to bypass the control valve in response to a manual operation.

2. A liquid pressure control system according to claim 1, wherein the manually operated valve is disposed in the valve housing so that it can be operated manually on a side opposite from the linear solenoid.

3. A liquid pressure control system according to claim 1, wherein the valve housing includes a first slide bore and a second slide bore with their axes parallel to each other, a first input port, a first output port and a releasing port being open into an inner surface of the first slide bore, and a second input port leading to the first input port and the liquid pressure source, a communication port leading to the first output port and a second output port leading to the actuator being open into an inner surface of the second slide bore; the first spool of the control valve is slidably received in the first slide bore in such a manner to switch over alternative connection and disconnection of the first output port to and from the first input port and the releasing port depending on the axial movement thereof; and a second spool of the manually operated valve is slidably received in the second slide bore in such a manner to switch over alternative connection and disconnection of the second output port to and from the communication port and the second input port depending on the axial movement thereof.

4. A liquid pressure control system according to claim 3, wherein the manually operated valve includes: the second spool, a manually operating element which is supported on the valve housing so that its position in a direction along the axis of the second slide bore can be adjusted, and which abuts against one end of the second spool; and a return spring for biasing the second spool toward the manually operating element.

5. A liquid pressure control system comprising a spool control valve mounted between a liquid pressure source and an actuator so that an output liquid pressure from the liquid pressure source can be controlled in accordance with a thrust exhibited by a linear solenoid, wherein a manually operated valve is disposed in a valve housing of the control valve to have an operational axis parallel to an axis of the linear solenoid, the manually operated valve being capable of blocking communication between the actuator and the control valve and bringing the liquid pressure source into communication with the actuator to bypass the control valve in response to the manual operation wherein the valve housing includes a first slide bore and a second slide bore with their axes parallel to each other, a first input port, a first output port and a releasing port being open into an inner surface of the first slide bore, and a second input port leading to the first input port and the liquid pressure source, a communication port leading to the first output port and a second output port leading to the actuator being open into an inner surface of the second slide bore: the first spool of the control valve is slidably received in the first slide bore in such a manner to switch over alternative connection and disconnection of the first output port to and from the first input port and the releasing port depending on the axial movement thereof: and a second spool of the manually operated valve is slidably received in the second slide bore in such a manner to switch over alternative connection and disconnection of the second output port to and from the communication port and the second input port depending on the axial movement thereof, and wherein a flat mounting surface for mounting the valve housing to a support is formed on one side of the valve housing in parallel to a direction of arrangement of the first and second slide bores, and the first output port and the communication port communicating with a communication recess formed in the mounting surface as well as the first input port, the releasing port, the second input port and the second output port each opening into the mounting surface are provided in the valve housing to have axes perpendicular to the mounting surface.

6. A liquid pressure control system comprising a spool control valve mounted between a liquid pressure source and an actuator so that an output liquid pressure from the liquid pressure source can be controlled in accordance with a thrust exhibited by a linear solenoid, wherein a manually operated valve is disposed in a valve housing of the control valve to have an operational axis parallel to an axis of the linear solenoid, the manually operated valve being capable of blocking communication between the actuator and the control valve and bringing the liquid pressure source into communication with the actuator to bypass the control valve in response to the manual operation wherein the valve housing includes a first slide bore and a second slide bore with their axes parallel to each other, a first input port, a first output port and a releasing port being open into an inner surface of the first slide bore, and a second input port leading to the first input port and the liquid pressure source, a communication port leading to the first output port and a second output port leading to the actuator being open into an inner surface of the second slide bore: the first spool of the control valve is slidably received in the first slide bore in such a manner to switch over alternative connection and disconnection of the first output port to and from the first input port and the releasing port depending on the axial movement thereof: and a second spool of the manually operated valve is slidably received in the second slide bore in such a manner to switch over alternative connection and disconnection of the second output port to and from the communication port and the second input port depending on the axial movement thereof, wherein the manually operated valve includes: the second spool, a manually operating element which is supported on the valve housing so that its position in a direction along the axis of the second slide bore can be adjusted, and which abuts against one end of the second spool: and a return spring for biasing the second spool toward the manually operating element, and wherein the manually operating element comprises: a first shaft portion which has, on its outer periphery, external threads meshed for advancing and retracting movements with internal threads provided on the inner surface of the second slide bore, and which has an inner end abutting against one end of the second spool; a second shaft portion which is formed to have a diameter larger than that of the first shaft portion and which is coaxially and integrally connected to an outer end of the first shaft portion in such a manner that an annular seal member is mounted on an outer periphery of the second shaft portion to come into sliding contact with the inner surface of the second slide bore outside the internal threads; and a head portion integrally connected to an outer end of the second shaft portion to enable a manually turning operation.

7. A liquid pressure control system according to claim 6, wherein an operating groove is provided in an outer end of the head portion formed to have a circular outer surface having a diameter enabling the insertion of the head portion into the outer end of the second slide bore, the operating groove extending along one diametrical line of the head portion.

8. A liquid pressure control system according to claim 6 or 7, wherein an annular engagement groove is provided in an outer periphery of the head portion, and a flat plate-shaped stopper is mounted to the valve housing and adapted to engage into the engagement groove in a state in which the second spool is in a position to cause the communication port to communicate with the second output port.

9. A liquid pressure control system according to claim 8, wherein the stopper is fastened to the valve housing by a single screw member threadedly meshed with the valve housing so that, in a state in which the screw member is loosened, the stopper can be turned about an axis of the screw member between an engaging position in which the stopper is in engagement in the engagement groove and an disengaging position in which the stopper is out of engagement in the engagement groove; and the stopper is provided with a turning movement-restricting portion adapted to abut against the valve housing in response to the turning movement of the stopper from the disengaging position to the engaging position in the same direction as a turning direction to tighten the screw member.

10. A liquid pressure control system according to claim 8, wherein the second spool is slidably received in the second slide bore for axial movement between a retracted position in which the communication port is in communication with the second output port; and an advanced position in which the second input port is in communication with the second output port; and the manually operating element is provided with an advancement-restricting portion adapted to abut against the valve housing to inhibit the advancement of the manually operating element in response to the movement of the second spool from the retracted position to the advanced position.

\* \* \* \* \*